(12) United States Patent
Wagstaff

(10) Patent No.: US 10,210,680 B2
(45) Date of Patent: Feb. 19, 2019

(54) CREDENTIAL CACHE

(71) Applicant: ASSA ABLOY AB, Stockholm (SE)

(72) Inventor: Russell Wagstaff, Witney (GB)

(73) Assignee: ASSA ABLOY AB (SE)

( * ) Notice: Subject to any disclaimer, the term of this patent is extended or adjusted under 35 U.S.C. 154(b) by 0 days.

(21) Appl. No.: 15/736,267

(22) PCT Filed: Jun. 14, 2016

(86) PCT No.: PCT/EP2016/063599
§ 371 (c)(1),
(2) Date: Dec. 13, 2017

(87) PCT Pub. No.: WO2016/202780
PCT Pub. Date: Dec. 22, 2016

(65) Prior Publication Data
US 2018/0182191 A1   Jun. 28, 2018

(30) Foreign Application Priority Data
Jun. 15, 2015   (EP) .................................... 15172069

(51) Int. Cl.
*G07C 9/00* (2006.01)
*H04W 12/08* (2009.01)
*G06F 12/0804* (2016.01)

(52) U.S. Cl.
CPC ..... *G07C 9/00103* (2013.01); *G06F 12/0804* (2013.01); *G07C 9/00309* (2013.01);
(Continued)

(58) Field of Classification Search
CPC . G07C 9/00103; G06F 12/0804; H04W 4/023
(Continued)

(56) References Cited

U.S. PATENT DOCUMENTS

2003/0097561 A1* 5/2003 Wheeler ................ G06Q 20/02
  713/168
2003/0097573 A1* 5/2003 Wheeler ............ G06Q 20/4014
  713/182

(Continued)

FOREIGN PATENT DOCUMENTS

EP          2821970       1/2015
WO    WO 2015/010218    1/2015

OTHER PUBLICATIONS

Tamrakar "NFC Application Security," Aalto University, Nov. 20, 2012, 32 pages [retrieved online from: www.cse.hut.fi/fi/opinnot/T-110.5241/2012/luennot-files/Network%20Security%2007%20-%20NFC.pptx].

(Continued)

*Primary Examiner* — Allen T Cao
(74) *Attorney, Agent, or Firm* — Sheridan Ross P.C.

(57) ABSTRACT

It is presented a method performed for controlling access to a physical space. The method is performed in an access control device and comprises the steps of: communicating with an electronic key to authenticate the electronic key; performing a lookup of an access right using an identity of the electronic key in a credential cache when the access control device is unable to communicate with an access control server; and sending an unlock signal when the access right indicates that the electronic key should be granted access; retrieving, from the access control server, an access right indicating whether the electronic key should have access or not, when the access control device is able to communicate with the access control server; and updating the credential cache dential cache with the access right retrieved from the access control server.

12 Claims, 2 Drawing Sheets

(52) U.S. Cl.
CPC ........ *G07C 9/00571* (2013.01); *H04W 12/08* (2013.01); *G06F 2212/1008* (2013.01); *G06F 2212/154* (2013.01)

(58) Field of Classification Search
USPC .................................................. 340/5.6–5.64
See application file for complete search history.

(56) References Cited

U.S. PATENT DOCUMENTS

| | | | |
|---|---|---|---|
| 2003/0115151 A1* | 6/2003 | Wheeler ................ | G06Q 20/00 705/64 |
| 2010/0283361 A1* | 11/2010 | Sato .................... | G07C 9/00896 312/222 |
| 2014/0282993 A1 | 9/2014 | Van Till et al. | |
| 2016/0357154 A1* | 12/2016 | Shim ...................... | G06F 3/0346 |
| 2017/0134474 A1* | 5/2017 | Gao ........................ | H04L 67/04 |
| 2017/0147988 A1* | 5/2017 | Shin .................... | G06Q 10/1095 |
| 2017/0220751 A1* | 8/2017 | Davis .................... | A61B 5/0015 |
| 2017/0357215 A1* | 12/2017 | Shim ........................ | G06F 1/163 |
| 2017/0372547 A1* | 12/2017 | Fujiwara ................ | G06F 21/44 |
| 2017/0374047 A1* | 12/2017 | Fujiwara ............... | H04L 63/061 |

OTHER PUBLICATIONS

International Search Report and Written Opinion prepared by the European Patent Office dated Aug. 12, 2016, for International Application No. PCT/EP2016/063599.

\* cited by examiner

CREDENTIAL CACHE

CROSS REFERENCE TO RELATED APPLICATIONS

This application is a national stage application under 35 U.S.C. 371 and claims the benefit of PCT Application No. PCT/EP2016/063599 having an international filing date of 14 Jun. 2016, which designated the United States, which PCT application claimed the benefit of European Patent Application No. 15172069.5 filed 15 Jun. 2015, the disclosure of each of which are incorporated herein by reference.

TECHNICAL FIELD

The invention relates to a method, an access control device, a computer program and a computer program product relating to a credential cache for access rights.

BACKGROUND

Locks and keys are evolving from the traditional pure mechanical locks. These days, there are wireless interfaces for access control devices of electronic locks, e.g. by interacting with an electronic key. Such wireless to interfaces improve usability while electronic key management is significantly more flexible regarding management of access rights compared to pure mechanical locks.

The access control device communicates with an access control server to gain access rights for a particular electronic key. In that way, access for a particular electronic key can be managed centrally by managing the access rights stored in the access control server.

However, sometimes it occurs that communication between the access control device and the access control server fails for a period of time. During such a period, the access control device is unable to check access rights for an electronic key presented to it.

SUMMARY

It is an object of embodiments presented herein to provide an improved way to manage access right management when the access control device is unable to communicate with an access control server.

According to a first aspect, it is presented a method performed for controlling access to a physical space. The method is performed in an access control device and comprises the steps of: communicating with an electronic key to authenticate the electronic key; performing a lookup of an access right using an identity of the electronic key in a credential cache when the access control device is unable to communicate with an access control server; sending an unlock signal when the access right indicates that the electronic key should be granted access; retrieving, from the access control server, an access right indicating whether the electronic key should have access or not, when the access control device is able to communicate with the access control server; and updating the credential cache with the access right retrieved from the access control server. This implies a pull based population of the credential cache, i.e. an entry initiated by the access control device. In this way, the credential cache is automatically populated whenever a credential is to presented to the access control device.

The method may further comprise the steps of: receiving, initiated from the remote device, an access right indicating whether the electronic key should have access or not; and updating the credential cache with the access right received from the access control server. This implies a push based population of the credential cache, i.e. an entry initiated by the remote device, allowing great control of the credential cache.

The step of communicating may comprise communicating with the electronic key using a wireless communication protocol.

The credential cache may form part of the access control device.

The step of performing the lookup may comprise finding an access right entry in the credential cache for the electronic key.

The entry may comprise a validity time. In such a case, the step of sending an unlock signal comprises sending the unlock signal only when a current time is within the validity time of the entry.

The step of communicating with the electronic key may comprise performing a challenge-response procedure with the electronic key.

According to a second aspect, it is presented an access control device for controlling access to a physical space. The access control device comprises: a processor; and a memory storing instructions that, when executed by the processor, cause the access control device to: communicate with an electronic key to authenticate the electronic key; perform a lookup of an access right using an identity of the electronic key in a credential cache when the access control device is unable to communicate with an access control server; send an unlock signal when the access right indicates that the electronic key should be granted access; retrieve, from the access control server, an access right indicating whether the electronic key should have access or not, when the access control device is able to communicate with the access control server; and update the credential cache with the access right retrieved from to the access control server.

The access control device may further comprise instructions that, when executed by the processor, cause the access control device to: receive, initiated from a remote device, an access right indicating whether the electronic key should have access or not; and update the credential cache with the access right received from the remote device.

The credential cache may form part of the access control device.

The instructions to perform the lookup may comprise instructions that, when executed by the processor, cause the access control device to find an access right entry in the credential cache for the electronic key.

The entry may comprise a validity time. In such a case, the instructions to send an unlock signal comprise instructions that, when executed by the processor, cause the access control device to send the unlock signal only when a current time is within the validity time of the entry.

The instructions to communicate with the electronic key may comprise instructions that, when executed by the processor, cause the access control device to perform a challenge-response procedure with the electronic key.

According to a third aspect, it is presented a computer program for controlling access to a physical space. The computer program comprising computer program code which, when run on an access control device cause the access control device to: communicate with an electronic key to authenticate the electronic key; perform a lookup of an access right using an identity of the electronic key in a credential cache when the access control device is unable to communicate with an access control server; send an unlock signal when the access right indicates that the electronic key should be granted access; retrieve, from the access control server, an access right indicating whether the electronic key should have access or not, when the access control device is able to communicate with the access control server; and update the credential cache with the access right retrieved from the to access control server.

According to a fourth aspect, it is presented a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
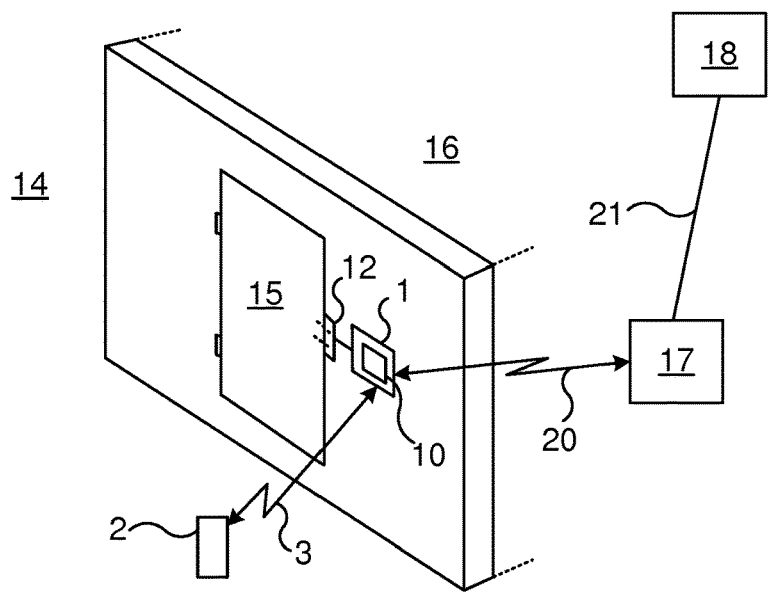
FIG. 1 is a schematic diagram showing an environment in which embodiments presented herein can be applied.

FIG. 1 is a schematic diagram showing an environment in which embodiments presented herein can be applied. Access to a physical space 16 is restricted by a physical barrier 15 which is selectively unlockable. The physical barrier 15 stands between the restricted physical space 16 and an accessible physical space 14. Note that the accessible physical space 14 can be a restricted physical space in itself, but in relation to this particular physical barrier 15, the accessible physical space 14 is accessible. The barrier 15 can be a door, gate, hatch, window, drawer, etc. In order to unlock the barrier 15, an access control device 1 is provided. The access control device 1 is connected to (or combined with) a physical lock device 12, which is controllable by the access control device 1 to be set in an unlocked state or locked state. The access control device 1 is mounted close to the physical lock device 12. The barrier 15 is provided in a surrounding fixed structure, such as a wall or fence.

The access control device 1 is able to receive and send signals from/to an electronic key 2 over a communication channel 3 which may be a short range wireless interface or a conductive (i.e. galvanic/electric) connection. The electronic key 2 is any suitable device portable by a user and which can be used for authentication over the communication channel 3. The electronic key 2 is typically carried or worn by a user and may be implemented as a physical key, a key fob, wearable device, smart phone, etc. The short range wireless interface is a radio frequency wireless interface and could e.g. be using Bluetooth, Bluetooth Low Energy (BLE), ZigBee, Radio Frequency Identification (RFID), any of the IEEE 802. 11 standards, any of the IEEE 802.15 standards, wireless Universal Serial Bus (USB), etc. The electronic key can also be considered to be a credential. Using the communication channel 3, the authenticity of the electronic key 2 can be checked, e.g. using a challenge and response scheme. In any case, an identity of the electronic key 2 is obtained, which is used to grant or deny access as explained in more detail below with reference to FIG. 2A. An access control server 18 is provided to control the access control system which can comprise a great number of barriers 15 and respectively connected lock devices 12 and access control devices 1. In this embodiment, the access control device can communicate with the access control server 18 via a hub 17. In this way, a first communication link 20 between the access control device 1 and the hub 17 can be wireless to simplify installation requirements for the access control device 1 and the lock device 12. For instance, the first communication link 20 can use Bluetooth, BLE, ZigBee, RFID, any of the IEEE 802.11 standards, any of the IEEE 802.15 standards, wireless USB, etc. In one embodiment, the first communication link 20 is based on IEEE 802.15.4.

The hub 17 can communicate with several access control devices, even though only one is shown in FIG. 1, and communicates with the access control server 18 via a second communication link 21. The second communication link 21 can be wired, wireless or a combination of both. In one embodiment, the second communication link 21 is (at least partially) based on RS-485 and/or Wiegand. Both the first communication link 20 and the second communication link 21 can utilise Internet Protocol (IP).

As with all communication links, the first communication link 20 and/or the second communication link 21 can fail on occasion, resulting in the access control device 1 being unable to communicate with the access control server 18. However, using embodiments presented herein, the access control device 1 can still function when the access control device 1 is unable to communicate with the access control server 18. This works by the access control device 1 using a credential cache 10 which is stored in local memory. The credential cache 10 contains a subset of the access rights for electronic keys. When the electronic key 2 is presented to the access control device 1, access rights are first checked with the access control server 18. However, if the access control device 1 is unable to communicate with the access control server 18, the access rights for the electronic key 2 is checked against the credential cache 10 in local memory. In this way, under some circumstances, the access control device 1 can grant access to valid electronic keys even when the access control device 1 is unable to communicate with the access control server 18.

When access is granted, the access control device 1 sends an unlock signal to the lock device 12, whereby the lock device 12 is set in an unlocked state. In this embodiment, this can e.g. imply a signal over a wire-based communication interface, e.g. using Universal Serial Bus (USB), Ethernet, a serial connection (e.g. RS-485 or RS-232) or even a simple electric connection, or alternatively signal over a wireless communication interface. When the lock device 12 is in an unlocked state, the barrier 15 can be opened and when the lock device 12 is in a locked state, the barrier 15 cannot be opened. In this way, access to a closed space 16 is controlled by the access control device 1. It is to be noted that the access control device 1 and/or the lock device 12 can be mounted in the fixed structure 16 by the physical barrier 15 (as shown) or in the physical barrier 15 itself (not shown). Optionally, the lock device 12 and access control device 1 are combined in one unit.

Optionally, energy harvesting of mechanical user actions and/or environmental power (solar power, wind, etc.) can be utilised to prolong the life span of the battery or even to allow a battery to be omitted for the access control device 1 and/or the lock device 12.

The presented access control system of FIG. 1 can be implemented in any suitable environment, e.g. in hotels, dormitories, hospitals, commercial buildings, for access to servers in server racks, etc.

Figure 2A:
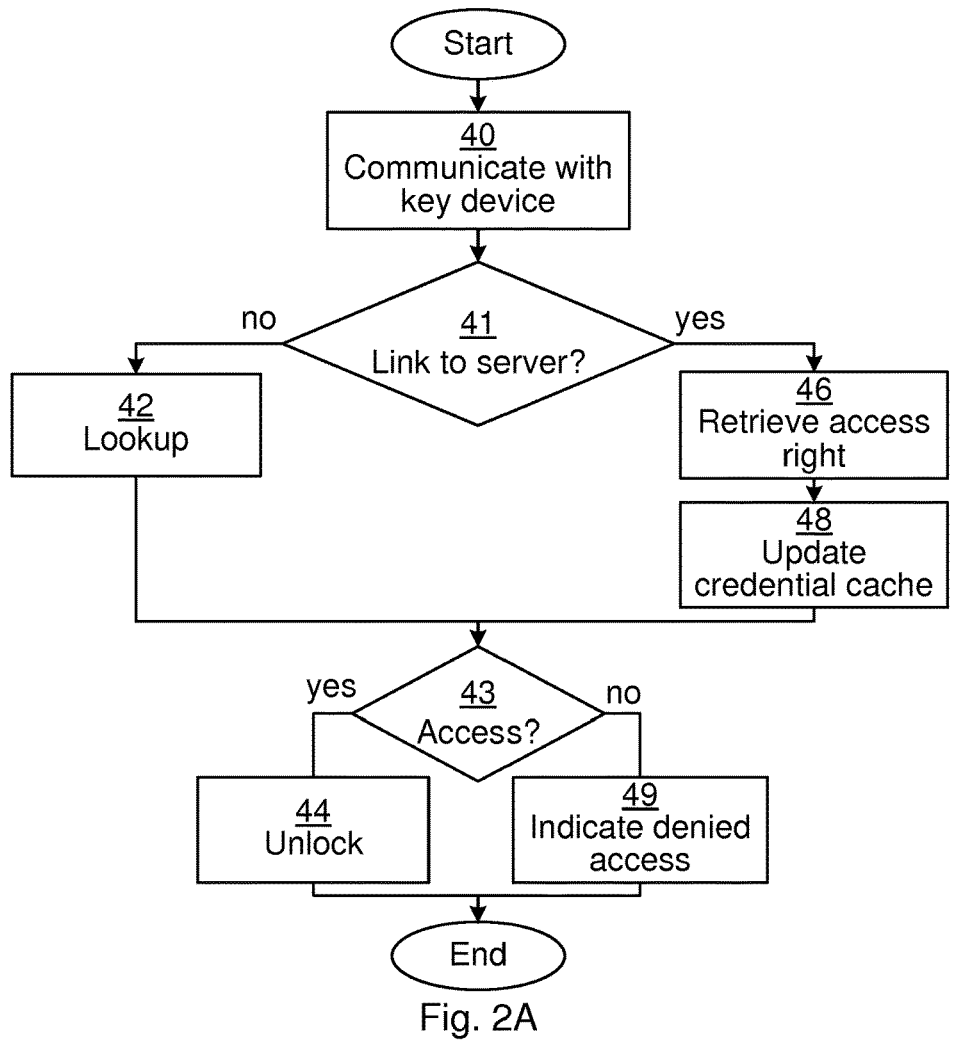
FIGS. 2A-B are flow charts illustrating methods for controlling access to a physical space, performed in the access control device of FIG. 1.
Figure 2B:
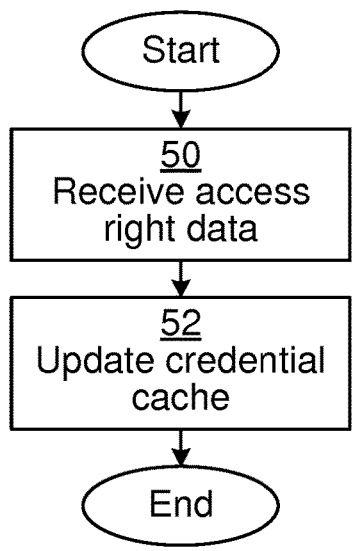

FIGS. 2A-B are flow charts illustrating methods for controlling access to a physical space, performed in the access control device of FIG. 1. First, the embodiments illustrated by FIG. 2A will be described.

Optionally, prior to this method is started, the credential cache has been pre-populated, e.g. at deployment or using a remote interface. Optionally, the pre-populated entries can have an infinite validity time, e.g. for high security maintenance personnel. This is described in more detail with reference to FIG. 2B below.

In a communicate with key device step 40, the access control device communicates with the electronic key to authenticate the electronic key. As explained above, the communicating with the electronic key can occur using a wireless communication protocol enable a simple user experience. Alternatively, the communicating can occur using a galvanic/electric connection with the electronic key.

The authentication can e.g. occur using a challenge-response procedure with the electronic key. In this way, an attacker can not emulate the electronic key only by observing the communication between the access control device and the electronic key.

In a conditional link to server step 41, it is determined whether the access control device is able to communicate with the access control server, e.g. in a scenario shown in FIG. 1, via a hub 17, or without a hub 17. If the access control device is unable to communicate with the access control server, the method proceeds to a lookup step 42 to check for access rights in the credential cache.

In the lookup step 42, a lookup of an access right is performed in the credential cache using an identity of the electronic key. The credential cache is a database stored locally to the access control device (such as part of the access control device) which holds a subset of the access rights stored in the central access control system.

The lookup can result in an entry found in the credential cache for the electronic key. The entry corresponds to an access right, whereby the entry is also called an access right entry. The access right can be a positive access right (access is allowed) or a negative access right (access is denied). Optionally, the entry comprises a validity time. As explained below, the credential cache is populated automatically when an electronic key is presented to the access control device at a time when the access control device is able to communicate with the access control server 18.

Optionally, each entry is updated with a last accessed timestamp when a to lookup is performed for the entry.

In a conditional access step 43, the access right is checked to see if access is to be granted. When no access right has been found, this implies denied access. When the access right comprises a validity time, access is granted only when a current time is within the validity time of the entry. Also, when the previous step was the lookup step (checking the credential cache), access is only granted when there is an entry for the electronic key in the credential cache. When access is granted, the method proceeds to an unlock step 44. When access is denied, the method optionally proceeds to an indicate denied access step 49. Otherwise, the method ends when access is denied.

In the unlock step 44, the access control device sends an unlock signal to set the barrier in an openable state.

In the optional indicate denied access step 49, the access control device indicates to the user that access is denied using visual and/or audible signals, e.g. a red light and a beep.

Going back to step 41, when the access control device is able to communicate with the access control server, the method proceeds to the retrieve access right step 46.

In the retrieve access right step 46, the access control device 1 retrieves, from the access control server, an access right indicating whether the electronic key should have access or not. The retrieved access right can be a grant of access or a denial of access. If no response or an empty response is received, this implies a denial of access.

In an update credential cache step 48, the credential cache is updated with the access right retrieved from the access control server. In this way, the credential cache is automatically updated. Hence, when the access right from the access control server indicates granted access, then the credential cache is updated to reflect this. Analogously, when the access right from the access control server indicates denied access, then the credential cache is updated to reflect this, e.g. by removing a previously valid entry or by amending the entry to indicate that access is to be denied for that particular electronic key.

In other words, the access control decision performed by the access control server in step 46 is stored in the credential cache in step 48. In this way, the credential cache is automatically updated any time a key device is presented to the access control device.

Optionally, the size of the credential cache (in number of entries) can be limited. In such a case, when the credential cache is full at the time of this step commencing this step comprises removing an entry to allow updating the credential cache with the new entry. For instance, an entry for which the last accessed timestamp is earliest can be removed.

Optionally, a validity time is set whenever a valid access right is updated. For instance, if electronic key with id x is already in the credential cache and an update of an access right of granted access is to be performed for electronic key with id x, the corresponding entry in the credential cache can be updated with a new validity time. The validity time can be configured to any suitable time, e.g. one hour, 24 hours, one week, etc. from the time of the update. The validity time can be configured arbitrarily by the system owner. A longer validity time improves convenience in that older access rights of granted access allow the same electronic key to gain access during a communication failure. However, a longer validity time also increases the risk of a cancelled access right to not have effect in the event of a communication failure between the access control device and the access control server. Hence, the validity time can be configured by the system owner to achieve the desired balance between convenience and security.

After the update credential cache step 48, the method proceeds to the conditional access step 43, using the access right retrieved from the access control server.

Optionally, the credential cache functionality can be activated or deactivated remotely. Alternatively, the credential cache functionality is configured to be active according to a schedule. For instance, the credential cache may be active during office hours, but inactive at other times. In this way, security at off hours is not compromised while access during office hours is improved even during communication failures.

Using this method, the credential cache is automatically populated whenever an electronic key is presented to the access control device. Compared to manual management of a local access right list by an operator, this method is much more convenient. Moreover, the method is scalable to a great number of access control devices, since each access control device automatically manages its own credential cache. The presented method also requires no integration with the hub or with the access control server, since the access control device manages the credential cache autonomously.

Looking now to FIG. 2B, this shows steps which can optionally be performed prior to the method shown in FIG. 2A and described above.

In a receive access right data step 50, the access control device 1 receives access right data from a remote device, such as the access control server 18 or an access control system remote management terminal.

In an update credential cache step 52, the access control device 1 updates the credential cache with the access right data received in step 50.

These steps allow remote management of the credential cache over a remote interface. Entries added in this way are here denoted remote entries, even though they are stored locally to the access control device. The remote interface can be used by a manual operator controlling a remote device (such as an access control system management terminal or the access control server) or it can be used by a computer program executed by the access control server or other remote device.

The steps of FIG. 2B can be used, e.g. prior to embodiments illustrated in FIG. 2A, to pre-populate the credential cache, e.g. at deployment or using a remote interface. Optionally, the pre-populated entries can have an infinite validity time, e.g. for high security maintenance personnel.

In the lookup step 42 described above, the credential cache can then contain dynamically populated entries (from the update credential cache step 48) and/or remotely populated entries (from the update credential cache step 52). Optionally, the dynamically populated entries and the remotely populated entries are stored in the same database. Optionally, these two types of entries can be differentiated by an indicator in each entry. For instance, Table 1 shows an example of entries in a credential cache.

TABLE 1

Example credential cache table

| Credential id | Dynamic remote | Valid until | Positive/ negative |
| --- | --- | --- | --- |
| 132 | remote | infinite | positive |
| 532 | dynamic | 2016 Jun. 20 15:00 | positive |
| 254 | dynamic | 2016 Jun. 21 08:00 | negative |
| 840 | remote | infinite | negative |
| 342 | dynamic | 2016 Jun. 22 17:00 | Positive |

The first column is the credential identifier. Optionally, each entry is a hash value of the credential identifier. The hash value is calculated by the access control device from the original credential identifier using any suitable one-way function, e.g. SHA256 (Secure Hash Algorithm 256), MDA6 (Message Digest Algorithm 6), etc. In this way, the size of the entry in the first column is always the same and security is increased since the table does not store actual credential identifiers. Optionally, the hash value also depends on a unique lock key, whereby a hash value for a credential for one lock cannot be used for another lock.

The credential identifier (or its hash value) is matched, in the lookup step 42, against an identifier (or its hash value) received in the communicate with key device step 40. The second column indicates the source of the entry, which can be dynamic (from step 48) or remote (from step 52). The third column defines a validity of the entry, here indicated in the format 'year-month-date hour:minute' or 'infinite' for infinite validity. The last column indicates whether the entry indicates a positive access right or a negative access right. It is to be noted that there may be additional columns in the credential cache table not shown in this example, such as a timestamp of when the entry was added (or updated), etc. Optionally, remote (indicated in the second column) entries are given priority over dynamic entries, to allow full remote control of the access operation of the access control device.

Optionally, the depth, i.e. number of entries, in the credential cache can be configured over the remote interface to the access control device. Moreover, an audit trail indicating access history (comprising successful and attempted unsuccessful access events) of the access control device, can be retrieved from the access control device to the access control server or management terminal using the remote interface.

Optionally, the remote interface can be used to configure the access control device to disregard any dynamic entries in the cache, i.e. disable or enable the dynamic cache functionality. Optionally, the remote interface can be used to configure the access control device to disregard any remote entries in the cache, i.e. disable or enable the remote cache functionality. It is to be noted that the entries can remain in the credential cache table in case the cache functionality is enabled again at a later stage.

Optionally, the remote (and/or dynamic) entries are stored in persistent memory of the access control device, e.g. flash memory, so that the entries configured remotely are still there and applied after a power failure. When the access control device starts, the entries of the credential cache can be loaded into Random Access Memory (RAM) to improve performance during operation. Any updates to the credential cache can then be written both to the credential cache in RAM and the credential cache in the persistent memory to ensure synchronisation.

Using this system, the operator of the access control system is provided with great security and flexibility. Since the credential cache table is stored locally to the access control device, it is available even if there is a network communication failure at some point between the access control device and the access control server. The dynamic entries provide an automatic maintenance of the credential cache table. At the same time, the remote entries provide great control for the operator of the access control system to grant or deny access to particular credentials. In other words, using this system, entries in the table can be populated both using a pull mechanism, for the dynamic entries, and using a push mechanism, for the remote entries. Moreover, the remote entries allow the credential cache to be populated at installation, when there may not be any (or only few) dynamic entries in the credential cache.

One use of the remote interface is to configure super user access, for instance for maintenance personnel, such that super users can always be granted access, even if there is a communication failure and even though the super user in question may never have been granted access by the particular access control device previously (and may thus not have a dynamic entry in the credential cache). This can be of critical use e.g. in case of fire or other disaster when communication can be down but super users may need access to the physical space controlled by the access control device.

Figure 3:
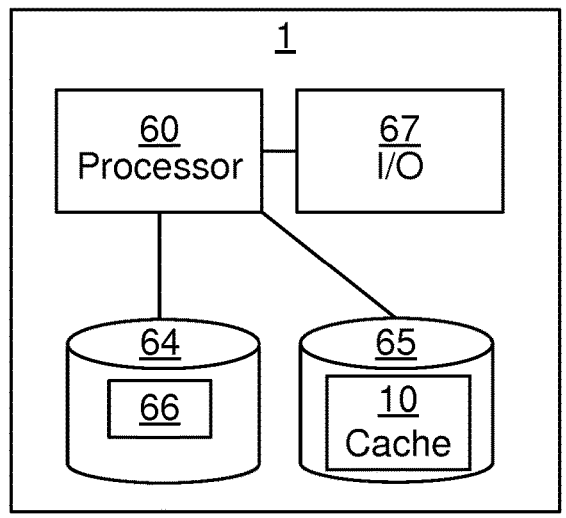
FIG. 3 is a schematic diagram illustrating some components of an access control device according to FIG. 1.

FIG. 3 is a schematic diagram showing some components of the access control device 1 of FIG. 1. A processor 60 is provided using any combination of one or more of a suitable central processing unit (CPU), multiprocessor, microcontroller, digital signal processor (DSP), application specific integrated circuit etc., capable of executing software instructions 66 stored in a memory 64, which can thus be a computer program product. The processor 60 can be configured to execute the method described with reference to FIGS. 2A-B above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 65 is also provided for reading and/or storing data during execution of software instructions in the processor 60. The data memory 65 can be any combination of read and write memory (RAM) and read only memory (ROM) which may be persistent and/or volatile memory. The data memory 65 can form part of the access control device 1 or be external, but local to, the access control device 1. The data memory 65 can store the credential cache 10 described above. The credential cache can be stored in a persistent part of the data memory 65, e.g. in a flash memory.

The access control device 1 further comprises an I/O interface 67 for communicating with other external entities such as the lock device 12 and the electronic key 2. The I/O interface 67 may also comprise a reader for reading key cards with a magnetic strip or a smart card. The I/O interface 67 may support wire-based communication, e.g. using Universal Serial Bus (USB), Ethernet, or even a simple electric connection (e.g. to the lock device 12) or a galvanic/electric connection for communicating with the electronic key 2.

Alternatively or additionally, the I/O interface 67 supports wireless communication, e.g. using Bluetooth, BLE, ZigBee, RFID, any of the IEEE 802.11 standards, any of the IEEE 802.15 standards, wireless USB, etc., e.g. for communication with the electronic key 2.

Other components of the access control device 1 are omitted in order not to obscure the concepts presented herein.

Optionally, the lock device 12 of FIG. 1 forms part of the access control device 1.

Figure 4:
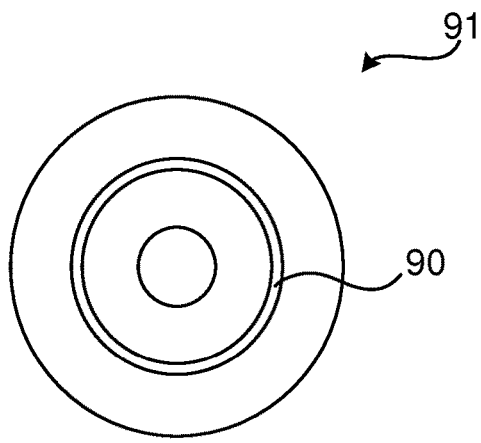
FIG. 4 shows one example of a computer program product comprising computer readable means.

FIG. 4 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 3. While the computer program 91 is here schematically shown as a track on the depicted optical disk, the computer program can be stored in any way which is suitable for the computer program product, such as a removable solid state memory, e.g. a Universal Serial Bus (USB) drive.

Here now follows a list of embodiments from another perspective, enumerated with roman numerals.

i. A method performed for controlling access to a physical space (16), the method being performed in an access control device (1) and comprising the steps of:
communicating (40) with an electronic key (2) to authenticate the electronic key (2);
performing (42) a lookup of an access right using an identity of the electronic key (2) in a credential cache (10) when the access control device (1) is unable to communicate with an access control server (18); and
sending (44) an unlock signal when the access right indicates that the electronic key (2) should be granted access.

ii. The method according to embodiment i, further comprising the steps of:
retrieving (46), from the access control server (18), an access right indicating whether the electronic key (2) should have access or not, when the access control device (1) is able to communicate with the access control server (18); and
updating (48) the credential cache (lo) with the access right retrieved from the access control server (18).

iii. The method according to any one of the preceding embodiments, wherein the step of communicating (40) comprises communicating with the electronic key using a wireless communication protocol.

iv. The method according to any one of the preceding embodiments, wherein the credential cache (10) forms part of the access control device (1).

v. The method according to any one of the preceding embodiments, wherein the step of performing (42) the lookup comprises finding an access right entry in the credential cache for the electronic key (2).

vi. The method according to embodiment v, wherein the entry comprises a validity time and wherein the step of sending (44) an unlock signal comprises sending the unlock signal only when a current time is within the validity time of the entry.

vii. The method according to any one of the preceding embodiments, wherein the step of communicating (40) with the electronic key (2) comprises performing a challenge-response procedure with the electronic key (2).

viii. An access control device (1) for controlling access to a physical space (16) comprising:
a processor (60); and
a memory (64) storing instructions (66) that, when executed by the processor, cause the access control device (1) to:
communicate with an electronic key (2) to authenticate the electronic key (2);
perform a lookup of an access right using an identity of the electronic key (2) in a credential cache (10) when the access control device (1) is unable to communicate with an access control server (18); and
send an unlock signal when the access right indicates that the electronic key (2) should be granted access.

ix. The access control device (1) according to embodiment viii, further comprising instructions (66) that, when executed by the processor, cause the access control device (1) to:

retrieve, from the access control server (18), an access right indicating whether the electronic key (2) should have access or not, when the access control device (1) is able to communicate with the access control server (18); and update the credential cache (10) with the access right retrieved from the access control server (18).

x. The access control device (1) according to embodiment viii or ix, wherein the credential cache (10) forms part of the access control device (1).

xi. The access control device (1) according to any one of embodiments viii to x, wherein the instructions to perform the lookup comprise instructions (66) that, when executed by the processor, cause the access control device (1) to find an access right entry in the credential cache for the electronic key (2).

xii. The access control device (1) according to embodiment xi, wherein the entry comprises a validity time and wherein the instructions to send an unlock signal comprise instructions (66) that, when executed by the processor, cause the access control device (1) to send the unlock signal only when a current time is within the validity time of the entry.

xiii. The access control device (1) according to any one of embodiments viii to xii, wherein the instructions to communicate with the electronic key (2) comprise instructions (66) that, when executed by the processor, cause the access control device (1) to perform a challenge-response procedure with the electronic key (2).

xiv. A computer program (91) for controlling access to a physical space (16), the computer program comprising computer program code which, when run on an access control device (1) cause the access control device (1) to:

communicate with an electronic key (2) to authenticate the electronic key (2);

perform a lookup of an access right using an identity of the electronic key (2) in a credential cache (10) when the access control device (1) is unable to communicate with an access control server (18); and send an unlock signal when the access right indicates that the electronic key (2) should be granted access.

xv. A computer program product (90) comprising a computer program according to embodiment xiv and a computer readable means on which the computer program is stored.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method performed for controlling access to a physical space, the method being performed in an access control device and comprising the steps of:

communicating with an electronic key to authenticate the electronic key;

performing a lookup of an access right using an identity of the electronic key in a credential cache when the access control device is unable to communicate with an access control server;

sending an unlock signal when the access right indicates that the electronic key should be granted access;

retrieving, from the access control server, an access right indicating whether the electronic key should have access or not, when the access control device is able to communicate with the access control server;

updating the credential cache with the access right retrieved from the access control server;

receiving, initiated from a remote device, an access right indicating whether the electronic key should have access or not; and updating the credential cache with the access right received from the remote device.

2. The method according to claim 1, wherein the step of communicating comprises communicating with the electronic key using a wireless communication protocol.

3. The method according to claim 1, wherein the credential cache forms part of the access control device.

4. The method according to claim 1, wherein the step of performing the lookup comprises finding an access right entry in the credential cache for the electronic key.

5. The method according to claim 4, wherein the entry comprises a validity time and wherein the step of sending an unlock signal comprises sending the unlock signal only when a current time is within the validity time of the entry.

6. The method according to claim 1, wherein the step of communicating with the electronic key comprises performing a challenge-response procedure with the electronic key.

7. An access control device for controlling access to a physical space comprising:

a processor; and a memory storing instructions that, when executed by the processor, cause the access control device to:

communicate with an electronic key to authenticate the electronic key;

perform a lookup of an access right using an identity of the electronic key in a credential cache when the access control device is unable to communicate with an access control server ;

send an unlock signal when the access right indicates that the electronic key should be granted access;

retrieve, from the access control server, an access right indicating whether the electronic key should have access or not, when the access control device is able to communicate with the access control server;

update the credential cache with the access right retrieved from the access control server;

receive, initiated from a remote device, an access right indicating whether the electronic key should have access or not; and update the credential cache with the access right received from the remote device.

8. The access control device according to claim 7, wherein the credential cache forms part of the access control device.

9. The access control device according to claim 7, wherein the instructions to perform the lookup comprise instructions that, when executed by the processor, cause the access control device to find an access right entry in the credential cache for the electronic key.

10. The access control device according to claim 9, wherein the entry comprises a validity time and wherein the instructions to send an unlock signal comprise instructions that, when executed by the processor, cause the access control device to send the unlock signal only when a current time is within the validity time of the entry.

11. The access control device according to claim 7, wherein the instructions to communicate with the electronic key comprise instructions that, when executed by the processor, cause the access control device to perform a challenge-response procedure with the electronic key.

12. A method of operating a computer program for controlling access to a physical space, the computer program comprising code which, when run on an access control device causes the access control device to perform the method, which comprises:

communicating with an electronic key to authenticate the electronic key;

performing a lookup of an access right using an identity of the electronic key in a credential cache when the access control device is unable to communicate with an access control server;

sending an unlock signal when the access right indicates that the electronic key should be granted access;

retrieving, from the access control server, an access right indicating whether the electronic key should have access or not, when the access control device is able to communicate with the access control server;

updating the credential cache with the access right retrieved from the access control server;

receiving, initiated from a remote device, an access right indicating whether the electronic key should have access or not; and updating the credential cache with the access right received from the remote device.

* * * * *